May 18, 1965 H. F. A. GROTH 3,184,749

ELECTROSTATIC DRUM PRINTER

Filed Feb. 13, 1962

INVENTOR.
HANS F.A. GROTH

BY

Benjamin J. Daniel

ATTORNEY

United States Patent Office 3,184,749

Patented May 18, 1965

3,184,749
ELECTROSTATIC DRUM PRINTER

Hans F. A. Groth, King of Prussia, Pa., assignor to Burroughs Corporation, Detroit, Mich., a corporation of Michigan Filed Feb. 13, 1962, Ser. No. 173,063
12 Claims. (Cl. 346—74)

Figure 1:
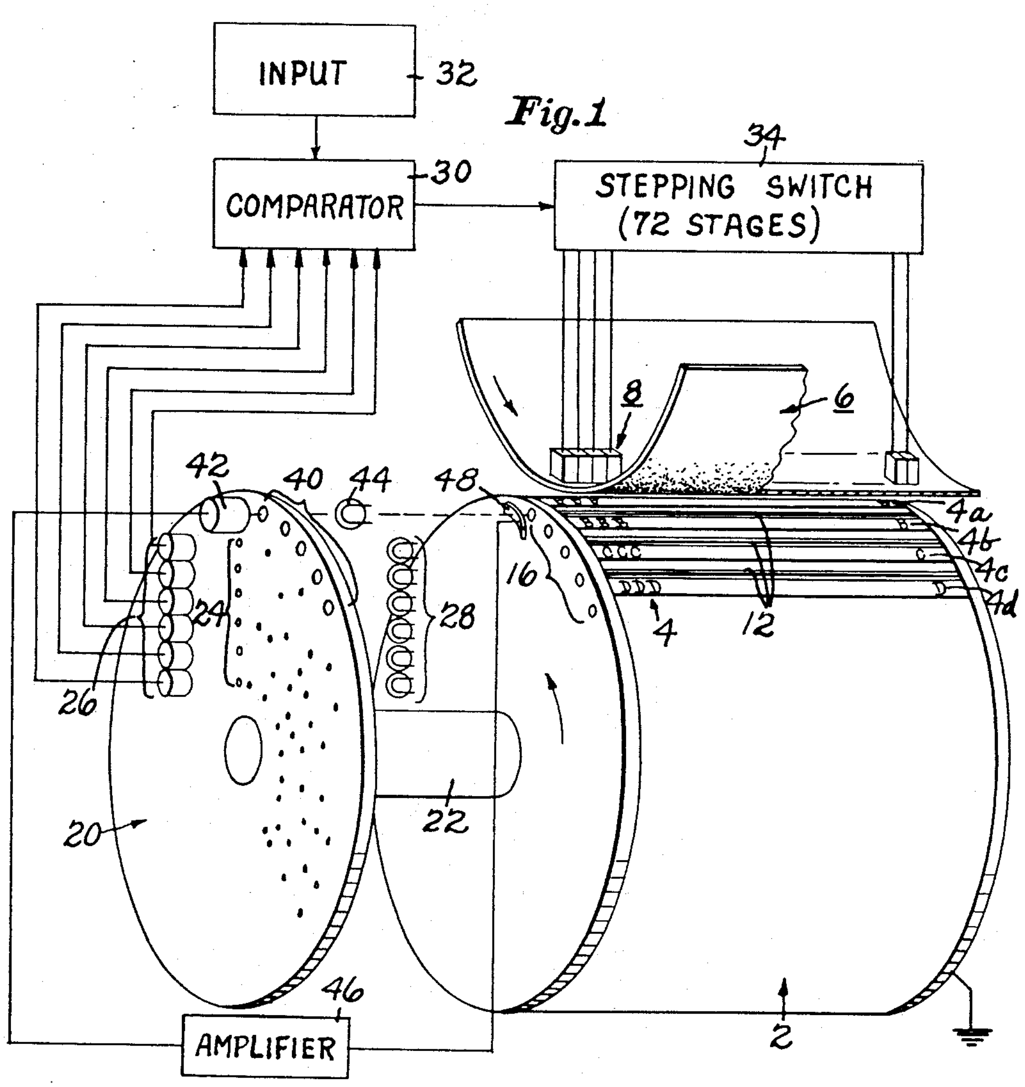

The present invention relates to drum printers or recorders, and particularly to high speed electrostatic drum printers.

Drum printers in general are characterized by a character-bearing drum which rotates at a uniform speed adjacent to a record medium. Usually printing is performed "on-the-fly", by effecting a printing or recording action, while the drum is in motion, at the exact instant the selected character on the drum is in recording position with respect to the record medium. One type of drum printer operates by mechanical impact, wherein a hammer is fired to print the selected character on a record medium as the drum rotates. Another type of drum printer records by an electrostatic action. This type of printer produces an electrostatic discharge from the preselected character onto the record medium, which is charge retentive, the record medium being later developed by powdered ink and fixed by heat and/or pressure. An example of the latter type drum printer is disclosed in Schwertz U.S. Patent No. 2,919,967.

An object of the present invention is to provide an improved electrostatic drum printer.

A further object of the present invention is to provide an electrostatic drum recorder or printer with a novel arrangement of electrodes as to facilitate the deposition of an electrostatic charge on the record medium in accordance with the selected character on the drum.

A still further object of the present invention is to provide an improved and simplified system for controlling a drum recorder or printer to print the characters representative of the input information.

In a typical drum printer, mechanical or electrostatic, the drum is provided with a plurality of characters which are formed as raised surfaces projecting from the cylindrical surface of the drum. The characters are grouped in a plurality of rows circumferentially spaced around the drum. Each row comprises a series of identical characters extending longitudinally of the drum, there being a separate series or row for each character the drum is capable of printing. In the embodiment herein illustrated, there are 64 different characters which the drum may print, and there are 72 characters to a line of printing. The drum, therefore, would be formed with 64 rows of characters with 72 characters in each row. In other words, the drum would be said to have 72 columnar positions in a printing line, in each position of which any one of 64 characters could be printed.

In the electrostatic drum printer herein described, the characters carried by the drum are made of conductive material and serve as electrodes each adapted, when actuated, to deposit an electrostatic charge on the record member in the same configuration as the character electrode. This electrostatic charge is later developed by passing the record member through powdered ink, and is finally fixed by heat and/or pressure. The described embodiment of the present invention is primarily concerned with the system up to and including the point where the electrostatic charge is deposited on the record medium. The developing and fixing steps are well known and therefore are not herein described in detail.

According to the present invention, the drum is formed with rows of raised character electrodes, as in previous printers, but with a longitudinally-extending groove between each row of characters. In each groove there is disposed an elongated electrode coextensive with the row of character electrodes. Each elongated electrode is adapted to cooperate with a row of character electrodes, and is more closely positioned to the row with which it cooperates than to the other row of the pair, but it is insulated from both rows. There is also provided a plurality of other electrodes spaced from, and extending longitudinally of, the drum such that they overlie the printing line. These latter electrodes are sometimes referred to as anvil electrodes or back electrodes. In operation, the record medium passes between the back electrodes and the character electrodes of the drum.

The arrangement is such that, in order to print a preselected character in a specific row and column, the elongated electrode of that row and the back electrode of that column must be pulsed in coincidence. When this occurs, an electrostatic discharge is produced from the character electrode which is in the column of the pulsed back electrode and in the row of the pulsed elongated electrode, and an electrostatic charge is deposited on the record medium in accordance with the configuration of the selected character electrode. In the embodiment illustrated, each elongated electrode is pulsed when its row of character electrodes is in printing line position, and the proper back electrode is pulsed to select the columnar position in which the selected character is to be printed.

The present invention also provides an improved and simplified arrangement, including a code disk and a series of photocells, for receiving the input information, comparing it to the instantaneous position of the drum, and then effecting printing from the drum when it is in the required position for printing the preselected character of the input.

Figure 2:
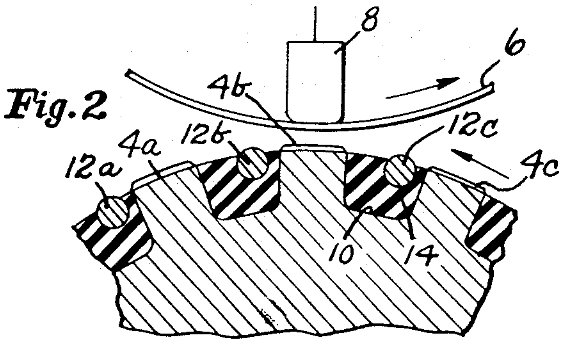

For a better understanding of the invention, as well as other objects and features thereof, reference may be had to the following description of a drum printer described herein as a preferred embodiment of the invention. In the drawings:

FIG. 1 is a schematic illustration of the drum printer including the circuitry shown schematically and in block form; and FIG. 2 is an enlarged fragmentary sectional view of the salient elements forming the electrostatic discharge gap.

For purposes of simplifying the description of the present invention, the embodiment illustrated is an electrostatic drum printer adapted to print one character at a time as they are serially received on an asychronous or random basis, or one out of 64 characters in each of the 72 columns per drum revolution, as stored in an input register.

As shown in FIG. 1, the printer includes a grounded metal drum 2 carrying a plurality of characters 4 formed as raised surfaces projecting from the cylindrical surface of the drum. The characters 4 are grouped in a plurality of rows circumferentially spaced around the drum, with each row consisting of a series of identical characters extending longitudinally of the drum. There are 64 different characters in the embodiment of FIG. 1, the characters consisting of the complete alphabet, the numerals 0–9, and special symbols. Thus, there would be one longitudinal row *4a* of A's, one row *4b* of B's, one row *4c* of C's, one row *4d* of D's, and so on throughout the complete alphabet, numerals and special symbols, totaling in all 64 character rows. In each row there are 72 characters, which means that the drum is capable of printing a 72-character printing line. All the characters borne by the drum are of metal, integral with the drum, and serve as electrode faces adapted to deposit an electrostatic charge on a record medium 6. The record medium has charge retentive characteristics and for this purpose may be coated with a plastic, such as polyethylene, adapted to retain an electrostatic charge.

Overlying the record medium 6 is a line of anvil or back electrodes 8, there being 72 such electrodes, one for each columnar position of the characters in the printing line. These back electrodes 8 are spaced from the drum and form an electrostatic discharge gap with the character electrodes 4 of the drum, through which the record member passes. The back electrodes 8 are part of the electrode system which selects and produces an electrostatic discharge from the character electrodes 4 to deposit a charge on member 6.

According to the present invention, the circumferential surface of the drum 2 is formed with a longitudinally extending groove 10 (FIG. 2) between each row of character electrodes 4. An elongated electrode 12, coextensive with the rows of character electrodes 4, is disposed in each groove 10 and is adapted to cooperate with a character row. Each elongated electrode is insulated from the character electrodes by insulating material 14, but is located closer to the row of character electrodes with which it cooperates than the other row of the pair. In FIG. 2 for example, it is seen that elongated electrode **12*a* is closer spaced to, and is coextensive with, row 4*a* with which it cooperates, and likewise elongated electrode 12*b* is closer spaced to, and coextensive with, row 4*b* with which it cooperates. The elongated electrodes 12, since they each cooperate with an individual row of character electrodes 4, may also be referred to as row electrodes to distinguish them from the character electrodes 4 and the back electrodes 8**. They are illustrated as rod-shaped, but could as well be bar-shaped, or of other configuration.

Each elongated electrode 12 terminates in a slip ring or contact 16 on one end face 2′ of the drum. There being 64 rows of character electrodes 14, there would thus be 64 elongated electrodes 12, and 64 contacts 16, one connected to each elongated electrode 12.

The arrangement, insofar as disclosed, is such that in order to print a preselected character in a specific row and column, the elongated electrode 12 of that row and the back electrode 8 of that column must be pulsed in coincidence. Pulsing one electrode without coincidentally pulsing the other would fail to produce an electrostatic discharge such as would deposit a charge from the selected character on the record member 6. However, when both the back electrode 8 and the elongated electrode 12 are pulsed in coincidence, there is produced an electrostatic discharge from the character electrode of the row cooperating with the pulsed elongated electrode 12, and of the column of the pulsed back electrode 8.

The means for selecting the character to print includes a code disk 20 secured to the drum shaft 22 to rotate with the drum 2. Disk 20 is formed with a group of openings 24 to represent in coded form the different characters on the drum. The group comprises 64 series of openings 24, one series for each character row. Each series comprises 1–6 openings. In other words, each character row of drum 2 is represented by a six-bit binary code on code disk 20, each bit of which is indicated by the presence or absence of an opening 24.

The presence or absence of openings 24 in any position of the disk 20 is sensed by an array of six photocells 26 arranged in a line and cooperable with a line of six light sources 28. Photocells 26 are arranged so that they will receive light from their respective light sources 28 when there is an opening 24, but will not receive the light when no opening is present. The six-bit binary code arrangement of openings 24 for each of the 64 character rows is thus translated to a six-bit signal by photocells 26. These signals are fed into a comparator 30, which receives the binary coded input signals from source 32 and compares the two signals for identity. If there is identity, comparator 30 transmits a signal to a 72-stage stepping switch 34 which applies a pulse to a back electrode 8 of the printer.

It is thus seen that when the position of drum 2 is such that the character line in printing position corresponds to the binary-coded signal from source 32, a pulse will be applied to one of the back electrodes 8. However, as noted earlier, this alone will not be effective to cause a recording electrostatic discharge from character electrodes, 4, since, before this occurs, there must be a coincidence of pulses to a back electrode 8 and to an elongated electrode 12.

Pulsing of elongated electrodes 12 is also controlled by code disk 20. For this purpose, disk 20 is formed with a further plurality of openings 40 arranged proximate to the outer periphery of the disk, there being one opening 40 for each one of the 64 positions of the disk and thereby one opening for each of the 64 rows of character electrodes 4. These openings represent the positions of the respective character rows from the printing line. Aligned with these openings 40 is another photocell system including photocell 42 and light source 44. It is thus seen that as disk 20 rotates, photocell 42 will produce a series of pulses in synchronism with the rotation of the disk.

The pulses from photocell 42 are amplified by an amplifier 46 and are fed to a brush 48 which sweeps over contacts 16 of the elongated electrodes 12 as the drum 2 rotates. The elongated electrodes 12 will thus be sequentially pulsed as the respective row of character electrodes of each assumes recording position with respect to the printing line as defined by the line of back electrodes 8.

Coincident pulsing of an elongated electrode 12 and the back electrode 8 will, as described above, produce an electrostatic discharge from the character of the preselected row and column.

As stepping switch 34 pulses one back electrode, it automatically steps one position so that it will be in condition to pulse the next succeeding back electrode when it receives the next pulse from comparator 30. The 72 back electrodes 8 are thus pulsed sequentially with each identity of signals from input 32 and photocells 26. After the 72nd back electrode 8 is pulsed, the stepping switch 34 returns to the first and starts a new line.

In operation, the characters in the form of a six-bit binary code are sequentially fed from input 32 into comparator 30. The first character of a line is compared with the signal produced by photocells 26 until it finds identity between the input signal and the signal from photocell 26 corresponding to the row of characters at the printing line. For example, if the first character of the line to be printed is a "C", the binary coded representation of that character is inserted in comparator 30. As drum 2 rotates, e.g. starting with the row **4*a* at the printing line, disk 20 and photocells 26 generate binary coded signals representative of the letter "A" and feed such signals into the comparator. Since there is no identity between the signal from input 32 and photocells 26, no output is produced from the comparator 30. Continued rotation of drum 2 advances the next character row 4*b* to the printing line and generates a signal representative of the character "B" through photocells 26, but again no output signal is produced from comparator 30 since there is no identity with the input signal representative of the character "C". Continued rotation of drum 2 advances character row 4*c* to the printing line and generates a signal representative of the character "C", which signal is fed into comparator 30 and compared with the input signal also representative of the character "C". The two signals being identical, the comparator will produce an output pulse to the 72-stage stepping switch 34. As this was the first character of the line to be printed, a pulse from driver 34 is applied to the first back electrode 8** of the line.

While this is occurring, a pulse is also being applied to the elongated electrode **12*c*, which cooperates with row 4*c* of the character electrodes, the latter pulse being generated from photocell 42 as disk 20 assumes the position where opening 40 corresponding to character row 4*c* is in alignment with light source 44 and photocell 42. This pulse from photocell 42 is applied through amplifier 46, brush 48, and contact 16 connected to elongated electrode 12c which cooperates with row 4c** of the character electrodes.

With the coincident pulsing of elongated electrode 12c and the first anvil electrode 8 of the printing line, an electrostic discharge is produced from the first columnar electrode of the row 4c of character electrodes. The electrostatic discharge thus produced lays a charge on record medium 6 representative of the letter "C" at the first printing position of the line.

At the time the stepping switch 34 is pulsed from comparator 30 to apply a pulse to the first back electrode 8, the switch is stepped one position so that when a next pulse is applied from comparator 30, the driver will pulse the second back electrode 8. Thus, the second character will be printed at the second columnar or printing position of the printing line. The switch is stepped one position with each pulse from comparator 30, so that it will be in condition to pulse the immediately succeeding back electrodes in order to print the succeeding characters in successive columnar positions. The stepping of switch 34 occurs throughout the 72 columnar positions of the printing line, and then resets to the first position to again pulse the first back electrode 8 for starting a new line.

As each line of characters is applied to the record medium 6 in the form of electrostatic charges, the record medium is advanced through an ink bath (not shown) which applies powdered ink to the electrostatic charges to develop the characters, and thenceforth to a fixing station (not shown), such as a heated pressure roll, which fixes the developed characters. These are not specifically illustrated in order to simplify the present description, but are well known and are disclosed in numerous earlier patents.

Also for purposes of simplifying the present description, the stepping switch 34 is shown merely schematically and in block form. For purposes of speed, it is preferably an electronic circuit, such as a 72-stage ring counter. Many circuits are known and available which could be used to sequentially pulse back electrodes 8 with each output pulse from comparator 30. Similarly, many circuits are known and available for comparator 30, amplifier 46, etc.

What has been described here for purposes of simplifying the description of the invention is a serial recorder where the characters are received and recorded one at a time on an asychronous or random basis. It will be appreciated that the features of the invention, particularly the structure of the electrostatic drum including the elongated electrodes 12, could be used in a parallel printer where the characters are received, compared, and buffered for printing all the same characters of a line at a time. It will be also appreciated that the electrostatic drum arrangement described could include additional electrodes, for example the auxiliary electrode system described in the application of George M. Le Baron, Serial No. 119,083, filed June 23, 1961, and assigned to the same assignee as the present invention. Further variations, modifications, and applications will be readily apparent to those skilled in the art still coming within the spirit and scope of the invention as defined in the following claims.

I claim:

1. In an electrostatic drum printer comprising a rotary drum bearing a plurality of character electrodes, said character electrodes being arranged in longitudinally extending rows with the rows spaced from each other circumferentially about the drum, the improvement comprising a plurality of elongated electrodes carried by the drum and each extending longitudinally between a pair of rows of character electrodes, and means electrically insulating said elongated electrodes from said character electrodes.

2. An electrostatic drum printer comprising a rotary drum bearing a plurality of character electrodes, said character electrodes being arranged in longitudinally extending rows with the rows spaced from each other circumferentially about the drum, a plurality of elongated electrodes carried by the drum, each elongated electrode extending longitudinally between a pair of rows of character electrodes and being spaced closer to one row of character electrodes than to the other row of the pair, and means electrically insulating said elongated electrodes from all said character electrodes.

3. A drum printer for electrostatically recording on a record medium, comprising: a rotary drum bearing a plurality of character electrodes configured in accordance with the characters to be printed, said character electrodes being arranged in longitudinally extending rows with the rows spaced from each other circumferentially about the drum; a plurality of elongated electrodes each extending longitudinally between a pair of rows of character electrodes and adapted to cooperate with an individual one of the rows of character electrodes; means insulating said elongated electrodes from said character electrodes; a row of back electrodes defining the printing line position and the columnar positions of the characters to be printed on the record medium, said back electrodes being spaced from the character electrodes of said drum to form an electrostatic discharge gap therebetween through which the record medium is conveyed; separate means for electrically pulsing the back electrode of the columnar position of the character to be printed and for electrically pulsing the elongated electrode of the character electrode row of the character to be printed, and means controling said separate pulsing means and operable in response to the rotation of the drum for pulsing the elongated electrode associated with the character electrode row containing the selected character at the time the row passes by the printing line position and for simultaneously pulsing the back electrode opposite to the desired columnar position for printing the selected character.

4. A drum printer for electrostatically recording on a record medium, comprising: a rotary drum bearing a plurality of character electrodes configured in accordance with the characters to be printed, said character electrodes being arranged in longitudinally extending rows with the rows spaced from each other circumferentially about the drum, a plurality of elongated electrodes each extending longitudinally between a pair of rows of character electrodes and adapted to cooperate with one of the rows of character electrodes; means insulating said elongated electrodes from said character electrodes; a row of back electrodes defining the printing line position and the columnar positions of the characters to be printed on the record medium, said back electrodes being spaced from the character electrodes of said drum to form an electrostatic discharge gap therebetween through which the record medlium is conveyed; means responsive to the rotation of the drum for successively electrically pulsing each elongated electrode as its cooperative row of character electrodes sweeps past the printing line position defined by the row of back electrodes, and means for electrically pulsing the back electrode of the columnar position of the character to be printed simultaneously with the pulsing of the elongated electrode cooperatively associated with the selected character electrode row as the row sweeps past the printing line position, said latter means including a stepping switch for pulsing said back electrodes in sequence so that successive characters are recorded in successive columnar positions of the printing line on the record medium.

5. A drum printer for electrostatically recording on a record medium, comprising: a rotary drum bearing a plurality of character electrodes configured in accordance with the characters to be printed, said character electrodes being arranged in longitudinally extending rows with the rows spaced from each other circumferentially about the drum, each row comprising character electrodes of the same configuration; a plurality of elongated electrodes each extending longitudinally between a pair of rows of character electrodes and adapted to cooperate with one of the rows of the pair; means insulating said elongated electrodes from said character electrodes; a row of back electrodes defining the printing line position and the columnar positions of the characters to be printed on the record medium, said back electrodes being spaced from the character electrodes of said drum to form an electrostatic discharge gap therebetween through which the record medium is conveyed; means responsive to the rotation of the drum for successively electrically pulsing each elongated elecrode as its cooperating row of character electrodes passes by the printing line position defined by the row of back electrodes, and means for electrically pulsing the back electrode in the columnar position in which a character is to be printed simultaneously with the pulsing of the elongated electrode associated with the character electrode row containing the character to be printed as said row passes the printing line position, said last means including a code disk rotatable with the drum and operable to generate a different signal for each character electrode row as the same passes by the printing line position.

6. A drum printer for electrostatically recording on a record medium, comprising: a rotary drum bearing a plurality of character electrodes configured in accordance with the characters to be printed, said character electrodes being arranged in longitudinally extending rows with the rows spaced from each other circumferentially about the drum; a plurality of elongated electrodes each extending longitudinally between a pair of rows of character electrodes and adapted to cooperate with one of the rows of character electrodes; a row of back electrodes defining the printing line position and the columnar positions of the characters to be printed on the record medium; and means for coincidentially pulsing the back electrode of the columnar position of the character to be printed and the elongated electrode of the character electrode row of the character to be printed; said latter means including a code disk coupled to rotate with said drum, means cooperable with said code disk for generating a first and a second signal corresponding to the character row of the drum in printing position, means for pulsing associated with the character electrode row in the printing line position elongated electrode in accordance with said first signal, a comparator for receiving an input signal representative of the character to be printed, circuit means for applying said second signal to said comparator, and means for pulsing a back electrode in response to identity in the comparator between said input signal and said second signal.

7. A drum printer for electrostatically recording on a record medium, comprising: a grounded rotary drum bearing a plurality of character electrodes configured in accordance with the characters to be printed, said character electrodes being arranged in longitudinally extending rows with the rows spaced from each other circumferentially about the drum, each row comprising character electrodes of the same configuration; a plurality of elongated electrodes each individual to a pair of adjacent rows of character electrodes and extending longitudinally therebetween and each said elongated electrode adapted to cooperate electrically with one of the rows of character electrodes; means insulating said elongated electrodes from all said character electrodes; a row of back electrodes defining the printing line position and the columnar positions of the characters to be printed on the record medium, said back electrodes being spaced from the character electrodes of said drum to form an electrostatic discharge gap therebetween through which the record medium is conveyed; and means for coincidentally pulsing the back electrode of the columnar position of the character to be printed and the elongated electrode of the character electrode row of the character to be printed; said latter means including a code disk coupled to rotate with said drum, a photocell system cooperable with said code disk for generating a first and a second signal corresponding to the character row of the drum in printing position, means for receiving said first signal and responsive to the rotation of the code disk for electrically pulsing each said elongated electrode as its associated character electrode row moves through the printing line position defined by the row of back electrodes, a comparator for receiving an input signal representative of the character to be printed, circuit means for applying said second signal to said comparator, and means for pulsing a back electrode in response to identity in the comparator between said input signal and said second signal.

8. A drum printer for electrostatically recording on a record medium, comprising: a rotary drum bearing a plurality of character electrodes configured in accordance with the characters to be printed, said character electrodes being arranged in longitudinally extending rows with the rows spaced from each other circumferentially about the drum, each row comprising character electrodes of the same configuration and differing from the configuration of the character electrodes in other rows; a plurality of elongated electrodes each individual to a pair of adjacent rows of character electrodes extending longitudinally therebetween in electrical field association with one of the rows of character electrodes; means insulating said elongated electrodes from all said character electrodes; a row of back electrodes defining the printing line position and the columnar positions of the characters to be printed on the record medium, said back electrodes being spaced from the character electrodes of said drum to form an electrostatic discharge gap therebetween through which the record medium is conveyed; and means for coincidentally pulsing the back electrode of the columnar position of the character to be printed and the elongated electrode of the character electrode row of the character to be printed; said latter means including a code disk coupled to rotate with said drum, said code disk including a first group of openings consisting of an opening for each row of characters on said drum, said code disk further including a second group of openings comprising a different series of openings for each row of characters on said drum, each series representing in coded form its respective character row, a photocell system cooperable with said code disk for simultaneously generating a first and a second signal as each character electrode row passes through the printing line position corresponding respectively to the first and the second groups of openings in the disk, means for pulsing said elongated electrode in accordance with said first signal, a comparator for receiving an input signal representative of the character to be printed, circuit means for applying said second signal to said comparator, and means for pulsing a back electrode in response to identity in the comparator between said input signal and said second signal.

9. A drum printer comprising: a rotary drum bearing a plurality of characters arranged in longitudinally extending rows with the rows spaced from each other circumferentially about the drum, each row consisting of characters of like configuration but differing from the character configurations in other rows of the drum; a code disk coupled to rotate with said drum, said code disk including a first group of openings consisting of an opening for each row of characters on said drum, said code disk further including a second group of openings comprising a series of openings for each row of characters on said drum, each series differing from others on the code disk and representing in coded form its respective character row; a photocell system cooperable with the openings in said code disk for generating a first signal indicating the passage of each character row by the printing line position and a second signal corresponding to the character row of the drum in printing position; a comparator for receiving an input signal representative of the character to be printed; circuit means for applying said second signal to said comparator; means for producing a third signal in response to identity in the comparator between said input signal and said second signal; and means responsive to coincidence of said first and third signals for effecting the printing of a character of said drum on a record medium.

10. A drum printer for electrostatically recording on a record medium, comprising: a grounded rotary drum bearing a plurality of character electrodes configured in accordance with the characters to be printed, said character electrodes being arranged in longitudinally extending rows with the rows spaced from each other circumferentially about the drum, each row comprising character electrodes of the same configuration but differing from the character configurations of adjacent rows; a plurality of elongated electrodes each individual to a pair of rows of character electrodes and extending longitudinally therebetween in electrical field association with one of the rows of character electrodes; means electrically insulating said elongated electrodes from all said character electrodes; a row of back electrodes defining the printing line position and the columnar positions of the characters to be printed on the record medium, said back electrodes being spaced from the character electrodes of said drum to form an electrostatic discharge gap therebetween through which the record medium is conveyed; and means for coincidentally pulsing, for each character to be printed, the back electrode of the columnar position of the said character and the elongated electrode associated with the character electrode row of the said character; said latter means including a code disk coupled to rotate with said drum, said code disk including a first group of openings consisting of an opening for each row of characters on said drum, said code disk further including a second group of openings comprising a series of openings for each row of characters on said drum, each series representing in coded form its respective character row, a photocell system cooperable with said code disk simultaneously generating a series of first and second signals corresponding respectively to the first and second groups of openings in the code disk as each character electrode row traverses the printing line position, means for pulsing said elongated electrodes in sequence in accordance with said first signals, a comparator for receiving input signals representative of the characters to be printed, circuit means for applying said second signals in sequence to said comparator, a stepping switch, and means controlled by said stepping switch for pulsing said back electrodes in sequence in response to each identity in the comparator between said input signal and said second signal.

11. A drum printer for electrostatically recording on a record medium comprising, in combination, a rotary drum of cylindrical dimensions having on the periphery thereof a plurality of character electrodes configured in accordance with the characters to be printed, said character electrodes being arranged in longitudinally extending rows on the periphery of the drum with the rows spaced from each other circumferentially about the drum, and with each row consisting of character electrodes of the same configuration but differing from the configuration of character electrodes in other rows, the periphery of said drum being recessed between adjacent rows of the character electrodes and containing electrical insulating material therein, an elongated electrode partially embedded within the insulating material of each recess and so positioned with respect to one of the two rows of the character electrodes between which it extends as to establish an electrical field relationship therewith when current flows therethrough.

12. The drum printer, as set forth in claim 11, wherein each said elongated electrode extends to one end of the drum and has its terminal portion at that end exposed in a common plane with the terminal portions of the other elongated electrodes, and wherein electrical contact means is successively engageable with the exposed ends of the elongated electrodes as the drum rotates.

References Cited by the Examiner

UNITED STATES PATENTS

| | | | |
|---|---|---|---|
| 2,784,397 | 3/57 | Branson et al. | 346—74 X |
| 2,918,580 | 12/59 | Howell | 346—74 X |
| 3,023,731 | 3/62 | Schwartz | 346—74 |
| 3,091,767 | 5/63 | Kinsella | 346—74 |

IRVING L. SRAGOW, *Primary Examiner.*

UNITED STATES PATENT OFFICE

CERTIFICATE OF CORRECTION

Patent No. 3,184,749 May 18, 1965

Hans F. A. Groth

It is hereby certified that error appears in the above numbered patent requiring correction and that the said Letters Patent should read as corrected below.

Column 4, line 6, after "electrodes" strike out the comma; column 5, lines 6 and 7, for "electrostic" read -- electrostatic --; column 6, line 56, for "medlium" read -- medium --; column 7 line 14, for "elecrode" read -- electrode --; line 38, for "coincidentially" read -- coincidentally --; same column 7, line 45, after "pulsing" insert -- the elongated electrode --; lines 46 and 47, strike out "elongated electrode"; column 9, line 39, after "disk" insert -- for --.

Signed and sealed this 28th day of September 1965.

(SEAL)
Attest:

ERNEST W. SWIDER
Attesting Officer

EDWARD J. BRENNER
Commissioner of Patents